Dec. 3, 1940.      W. HERBERT      2,224,048
PROCESS FOR THE PRODUCTION OF HYDROCARBONS
Filed Nov. 24, 1937

Inventor
Wilhelm Herbert
Attorneys

Patented Dec. 3, 1940

2,224,048

UNITED STATES PATENT OFFICE 2,224,048

PROCESS FOR THE PRODUCTION OF HYDROCARBONS

Wilhelm Herbert, Frankfort-on-the-Main, Germany, assignor to American Lurgi Corporation, New York, N. Y., a corporation of New York Application November 24, 1937, Serial No. 176,373
In Germany December 2, 1936

10 Claims. (Cl. 260—449)

This invention relates to the catalytic production of hydrocarbons.

The catalytic conversion of gases containing oxides of carbon and hydrogen into liquid hydrocarbons of higher molecular weight with several linkages chiefly of the olefine and paraffin type, is performed with so-called synthesis gases in which the ratio of carbon monoxide to hydrogen is 1:2. In operating such synthesis on a manufacturing scale the object is to produce a gas with the highest possible degree of purity. For this reason, it is customary to produce a synthesis gas which contains up to 30% of carbon monoxide and 58 to 60% of hydrogen, so that the remainder consists of about 10 to 12% of inert gases ($CO_2$, $N_2$ and $CH_4$), that is, gases taking no part in the reaction, for the Fischer-Tropsch benzine synthesis process under ordinary pressure (see Brennstoffchemie, 1935, No. 1, pages 1–11).

Experiments have also been performed with diluted synthesis gases in which a degree of dilution—referred to a 100% mixture of carbon monoxide and hydrogen—of 20 to 40% is obtained by the addition of nitrogen, methane and carbon dioxide (see "Journal of the Society of Chemical Industry, Japan", vol. 37, No. 11, pp. 704–615 B). The yields of liquid products obtained in these experiments, and expressed in cubic centimetres per cubic metre of the synthesis gas, are inferior to those from a high-percentage synthesis gas with the usual $CO:H_2$ ratio of 1:2. On the contrary it was found that the extensively diluted gases have a very unfavorable effect on the benzine synthesis, and that progressive dilution of the original gas is accompanied by the production of a gradually more volatile and lighter synthetic benzine (loc. cit. p. 711 B).

It has been ascertained in accordance with the present invention that the same, and even better, results can be obtained in the conversion of carbon monoxide and hydrogen into liquid hydrocarbons by the aid of the known catalysts employed in the Fischer-Tropsch benzine-synthesis by increasing the content of inert gas constituents in the synthesis gases to a greater extent than usual, for example to over 20%, and performing the synthesis under a pressure exceeding that of the atmosphere (above 2 atmospheres for example) and at temperatures below those needed for the exclusive formation of methane. It is advisable, in these circumstances, to dilute the original gas to a greater extent as the working pressure is increased.

There are several possibilities to dilute the reaction gases according to the invention.

The well known synthesis of methanol by catalytic conversion of carbon monoxide and hydrogen-containing gases at temperatures above 250° C. and at pressures above 100 atmospheres gives an end gas after the formation of the known oxygen-containing products as alcohol, acetone, aldehyde which contains for example 15–25% CO, 10–20% $H_2$, 20–30% $CH_4$, the rest being $CO_2$ and $N_2$. Such a gas can be converted according to the invention in a second contact stage or stages in the presence of suitable catalysts at pressures between 1 to 200 atmospheres and at temperatures below 300° C., e. g. 180–260° C. into hydrocarbons of higher molecular weight, preferably of olefine and paraffin type. Thus after the methanol synthesis a second synthesis for forming benzine at a pressure considerably exceeding the atmospheric pressure is arranged, whereby known catalysts consisting, for example, of cobalt, thorium oxide and kieselguhr are employed.

Before employing the end gas of the methanol synthesis for a second synthesis according to the invention a part or all of the reaction products may be separated in known manner from the end gas. If necessary this end gas may be corrected with regard to its content of carbon monoxide and hydrogen by mixing with other suitable gases or by thermal decomposition of the methane or a part thereof before using it in the second stage of synthesis.

A dilute synthesis gas can also be produced, according to the present invention, in an extremely simple manner by starting, in known manner, with a normal technical synthesis gas containing about 12% of inert gas constituents and bringing such gas into reaction, under a pressure not much different from atmospheric pressure by the aid of the known catalysts used in the Fischer-Tropsch benzine-synthesis, as described for example in "Brennstoffchemie", 1932, No. 4, pp. 61 et seq. According to the invention, after removal of part, or all, of the reaction products, the resulting end gas—which is thus in a diluted condition with regard to its content of carbon monoxide and hydrogen—is next compressed and is converted—in several stages, if desired—in a second contact furnace, under elevated pressure, with the same known catalysts (such as 33% of Co, 5% of $ThO_2$ and 61% of kieselguhr).

Various attempts have also been made to perform the benzine synthesis under elevated pressure (for example, 5 to 10 atmospheres) with the known synthesis gas containing only up to about 15% of inert gas constituents. In so doing, however, such extensive amounts of high-boiling products were formed, which choked the pores of the catalyst, that the activity of the contact mass was speedily destroyed. Experiments of this kind are described in "Brennstoffchemie," vol. 12, No. 19, pp. 365–372, and vol. 14 (1933), No. 1, pp. 3–8. Although the catalyst remains active for a longer period when the reaction temperature is raised, undesirable water-soluble products—especially alcohols and acids—are formed which destroy the apparatus and render the practicability of the whole process problematical.

It has now been ascertained that the benzine synthesis can be very satisfactorily performed under elevated pressure (above 2 atmospheres, preferably above 20 atmospheres) if the synthesis gases be employed in an extensively dilute condition, that is to say, with a content of more than 20% of inert constituents ($CH_4$, $CO_2$, $N_2$). Most combustible or inert technical gases may be employed as diluents. Special advantages result from the employment, as admixtures, of such gases or vapors as can be easily removed from the end gases by the usual technical means, and therefore do not needlessly burden the attached apparatus for the separation of the reaction products. Such substances comprise $CO_2$, $H_2O$, alcohols, higher hydrocarbons, and so forth. It is also of advantage to employ, as diluents, substances (for example, $CH_4$, $CO_2$, and the like) which occur, in the reaction, as less desirable by-products of the synthesis. In this manner it is possible, according to the relative proportions of the mixture, not only to facilitate the performance of the synthesis under pressure, but also to control the reaction to a certain extent. If higher hydrocarbons, such as benzine vapors, be added to the synthesis gas, the reaction can be modified in the direction of an increased formation of oil or paraffin, and the same applies to the addition of gas-oil vapors. Moreover, the addition of benzine vapors to the synthesis gas increases the working life of the catalyst because an automatic extraction of the high-boiling substances which impair the activity of the catalyst, takes place to a certain extent.

The present process is applicable, with particular advantage, when the further employment of the synthesis gas—when freed from the reaction products—is contemplated, for instance, as illuminating gas or as original gas for the production of a further quantity of synthesis gases. In such case, the gas constituents lacking or present in insufficient amount in the end gas may be added to the latter, as diluents, prior to the entry of the synthesis gases into the contact furnace. In this way, two effects are obtained, viz. improved conditions for the reaction in the contact furnace, and the production of an end gas suitable for other useful purposes.

In a general way, it has been found that the content of admixed gases or vapors desirable in the interests of a smooth reaction may be the greater the higher the pressure employed for the reaction. The surprisingly favorable effect of dilute gases or vapors in performing the synthesis under pressure could not have been foreseen, inasmuch as, in performing the synthesis under normal pressure, the endeavor is to maintain the concentration of the actual synthesis gas at the highest possible level. In operating at normal pressure with diluted gases there is—as frequently described in the literature—an important diminution in the yield of liquid products.

The present process is also applicable in combination with existing plants operating with normal pressure by compressing and subjecting to synthesis under pressure, the end gases from a normal synthesis stage, which, after the removal of the reaction products, have become impoverished in unconverted synthesis gases. By this means, a far better total yield is obtained than by passing the diluted end gases—after the removal of the reaction products—through a second contact furnace, at atmospheric pressure, in the manner heretofore customary.

In addition to the employment of the means specified in the foregoing, the principle underlying the invention can be carried into practice by returning into circulation the end gas from the reaction after the complete removal of the reaction products and any surplus that may occur. There is no need to mix the fresh gas with that in circulation before their admission into the contact furnace, in fact, the incorporation of the fresh gas may be effected, with particular advantage, approximately midway of the reaction zone, or distributed by stages, over several reaction zones. In this way the reaction is more uniformly distributed over the contact furnace, whereas, otherwise the main reaction is concentrated in the gas-inlet side and gives rise to the risk of overheating and the intensified formation of undesired by-products.

*Example I*

The original gas for the synthesis had the composition:

$N_2$ 20%, $CO_2$ 7%, $CH_4$ 10%, $CO$ 21% and $H_2$ 42%

After passing this synthesis gas over a contact mass composed of Co 33%, $ThO_2$ 5% and kieselguhr 61%, at 190° C. and with a gas velocity of 1.6 N litres (=1.6 normal litres), the volume being calculated on a gas with 100% ($CO+H_2$), per 1 grm. of Co in the contact mass, and per hour, a yield of 68 grms. of benzine, oil and paraffin (i. e. liquid products) per N cubic metre (=1 normal cubic metre) of original gas was obtained when the operation was performed under normal (atmospheric) pressure. On carrying out the conversion in the same contact furnace at 12 atmospheres in accordance with the present invention a yield of 88 grms. of liquid hydrocarbons is obtained per N cubic metre when a lower temperature (180° C., instead of 190° C.) corresponding to the higher pressure is maintained. If the same original gas be converted with the same catalyst, at a pressure of 60 atmospheres and a temperature of 174° C., the yield of the said liquid hydrocarbons is increased to 96 grms. per N cubic metre.

A further advantage of the present invention consists in that increasing the pressure in the course of the catalysis greatly facilitates the separation of the valuable reaction products. The separation of other substances from the end gases of the synthesis stages operating under normal or elevated pressure, and also the residual gases remaining after the final stage of the synthesis, is also substantially facilitated (if such separation is to be effected). Thus, for example, by employing a higher pressure beyond the first stage, or portion, of the catalysis, all the oil and a large portion of the benzine can be separated—or even the whole of the benzine and of the gas oil, if the pressure be raised sufficiently— and the carbon dioxide can be washed out, in a simple manner, with water under pressure. An equally simple method of operating can be employed in the case of the end gas from each subsequent stage. It will be evident that instead of separating the reaction products solely by the application of pressure, a combined method, for example pressure and cold, may be employed (in stages if desired) or by means of ab- and adsorption apparatus, each of which can be used singly, two-by-two, in several groups, or all together in combination. The pressure may also be increased between the two parts, or individual stages, with a view to especially facilitating the separation of the reaction products, and by allowing expansion to occur prior to entering the next portion, or next reaction stage, in which case it is of advantage to recover in known manner, the energy liberated by the expansion with a view to lessening the power consumption of the compressors.

The pressure in the pressure stage of the catalysis may vary in degree. It is advisable to employ such a high pressure that the partial pressure of the gas constituents (carbon monoxide and hydrogen) coming into reaction in these stages corresponds, at least, to the partial pressure in the original gas in the synthesis at atmospheric pressure. If, for example, the end gas from the first stage—conducted at approximately 1 atmosphere—still contains 30% of ($CO+H_2$) of the 90% ($CO+H_2$) present in the original gas, then, according to the invention, the following stage is conducted under a pressure of, for example, at least 3 atmospheres. In the event of there being a third stage with a content of, for example 20% ($CO+H_2$) the pressure will, in accordance with the invention, be above 4½ atmospheres (for example, 5–6 atmospheres).

The reaction temperature in the pressure stage, or stages, of the catalysis, may be the same as those employed for the synthesis under atmospheric pressure, though either lower or higher temperatures may be applied the choice depending, for example, on the condition of the contact mass, and on the degree of pressure.

In general, lower temperatures will be employed in the case of a fresh contact mass; and of higher pressure, whereas, for lower pressure, or old contact masses, a higher reaction temperature is desirable. The process according to the invention is also applicable to working methods in which a gas circulation is maintained in one or more of the stages.

*Example II*

If a synthesis gas (so-called fresh gas) with the composition:

$N_2$ 4%, $CO_2$ 2%, $CH_4$ 4%, CO 30% and $H_2$ 60% be passed at atmospheric pressure over the catalyst described in Example I, and this normal synthesis gas be diluted by returning into circulation the end gases from this pressureless synthesis, a diluted synthesis gas, according to the invention, will be obtained with the approximate composition:

$N_2$ 10%, $CO_2$ 6%, $CH_4$+homologues 17%,
CO 22% and $H_2$ 45%

If the gas flow through the catalyst be again maintained at the rate of 1 N litre per grm. of cobalt and per hour—referred to the fresh gas—there will be obtained, at atmospheric pressure, and 190° C., 95 grms. of liquid hydrocarbons per N cubic metre of fresh gas, the yield at 12 atmospheres pressure and 180° C. being 121 grms., and at 60 atmospheres and 174° C., as much as 138 grms. per N cubic metre of fresh gas. If the pressure be finally increased to 200 atmospheres, it is advisable to increase the dilution of the gas still further on entering the contact furnace, for example by increasing the amount of end gas introduced into circulation, so that it will have the following approximate composition:

$N_2$ 20%, $CO_2$ 13%, $CH_4$ 42%, CO 8% and $H_2$ 17%

With this diluted gas a yield of 148 grms. of liquid hydrocarbons per N cubic metre of fresh gas is obtained by operating at 170° C. with the catalyst in accordance with the same conditions as before.

If, as already mentioned the synthesis gas be diluted by first subjecting an ordinary synthesis gas (with 10% of inert substances) to benzine synthesis, with the known catalysts, at ordinary pressure, the further treatment of the end gas in a second contact stage, under increased pressure in accordance with the invention, may be performed in a variety of ways. Both the ordinary pressure portion and the pressure portion of the synthesis may be subdivided into several stages, and the separation of the catalysis products can be effected during and/or at the end of each portion. The operation may also be conducted by effecting the complete or partial separation of the resulting reaction products, only during or after the pressure portion of the process.

A further considerable advantage of the present process consists in that the contact mass can be regenerated by occasionally relieving the pressure in individual elements of the contact furnace during the pressure portion of the process. This is done for example, by occasionally operating individual elements of the furnace for the pressure portion of the synthesis with the same gas, but under substantially lower pressure, which may be reduced to that of the atmosphere, and even lower. An excellent regenerative effect is produced in this manner and can be further intensified by passing the expanded gas, during this treatment, through the contact in the direction opposite so that normally taken by the reaction gas.

It is known to regenerate spent contact masses by steaming. This measure may also be adopted in the process according to the present invention, for example by adding steam, hydrogen, or the like, to the reaction or regenerative gas, for a longer or shorter period in one stage, or part of a stage, of the synthesis, or by employing the said gaseous media separately for steaming. According to the invention, the steaming process may take place, for example on the contact furnace for the pressure portion, and with or without positive pressure, or in vacuo. In all stages the best effect is produced by steaming at the lowest possible pressure, or in vacuo, superheated steam being preferably employed and admitted in counter- or transverse flow to the normal direction of the reaction gas.

In the accompanying drawing, apparatus suitable for carrying out the process of the present invention are shown diagrammatically.

Figure 1:
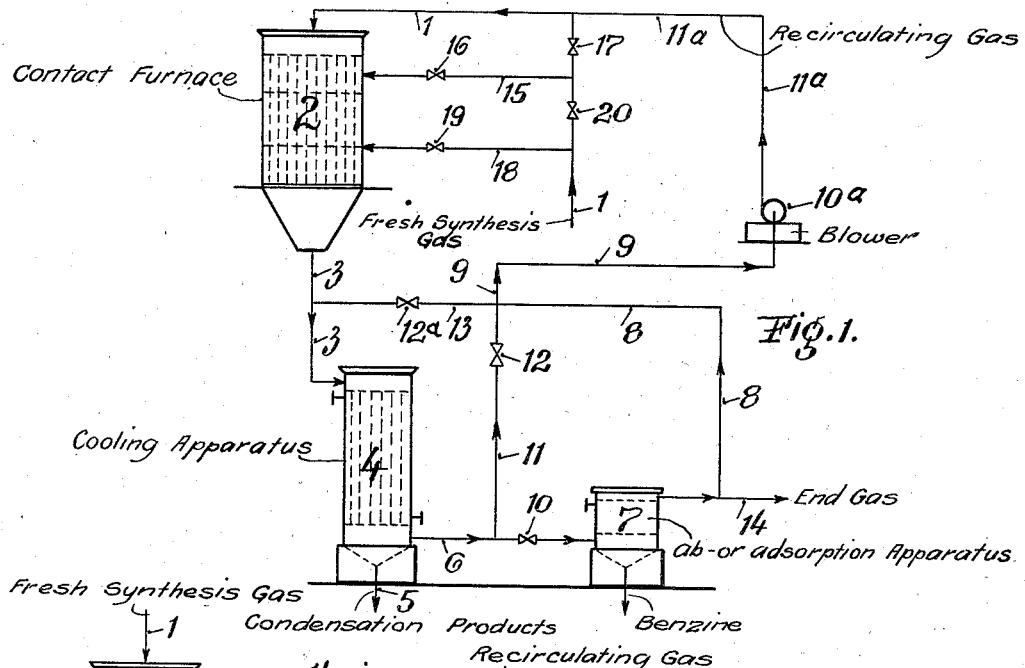
Fig. 1 shows an apparatus which may be employed for applicant's recirculatory process.

In Fig. 1, the conduit 1 serves for the introduction of the fresh synthesis gases into the contact furnace 2 which is provided with suitable cooling means. After the synthesis gases have been subjected to the catalytic conversion they leave the contact furnace 2 by the conduit 3 and are cooled in the cooling means 4. The condensation products are withdrawn through the conduit 5. The cooled gases leave the cooling means 4 through conduit 6 and are introduced into the ab- or adsorption apparatus 7 for the removal of the more volatile constituents such as benzine and gasoils or by closing valve 10 and opening valve 12. Such gases are recirculated through the conduits 11 and 9 with the aid of the suction pump 10a and through conduit 11a into the conduit 1. In the latter instance only a portion of the gases is introduced into the ab- or adsorption apparatus corresponding to the amount of the fresh synthesis gases introduced into conduit 1 calculated with reference to the contraction which takes place during the catalytic conversion. A corresponding portion of the end gas is continuously withdrawn from the ad- or absorption apparatus through conduit 14 when valve 12 is closed and 10 is open and the remainder of the end gas is returned to the contact furnace by means of conduits 8, 9, 11a and 1 and the suction pump 10a. If only light easily vaporizable hydrocarbons are formed under the conditions of the conversion, the end gas may be recirculated back to the contact furnace before it reaches the cooling apparatus 4 through conduits 13, 9, 11a and 1 by opening valve 12a.

Conduit 1 also is provided with the two branch conduits 15 and 18 provided respectively with valves 16 and 19 in order that by suitable setting of valves 17 and 20 fresh synthesis gas may be introduced into the contact furnace at one or more points beyond the point at which the recirculated end gas is introduced therein.

Figure 2:
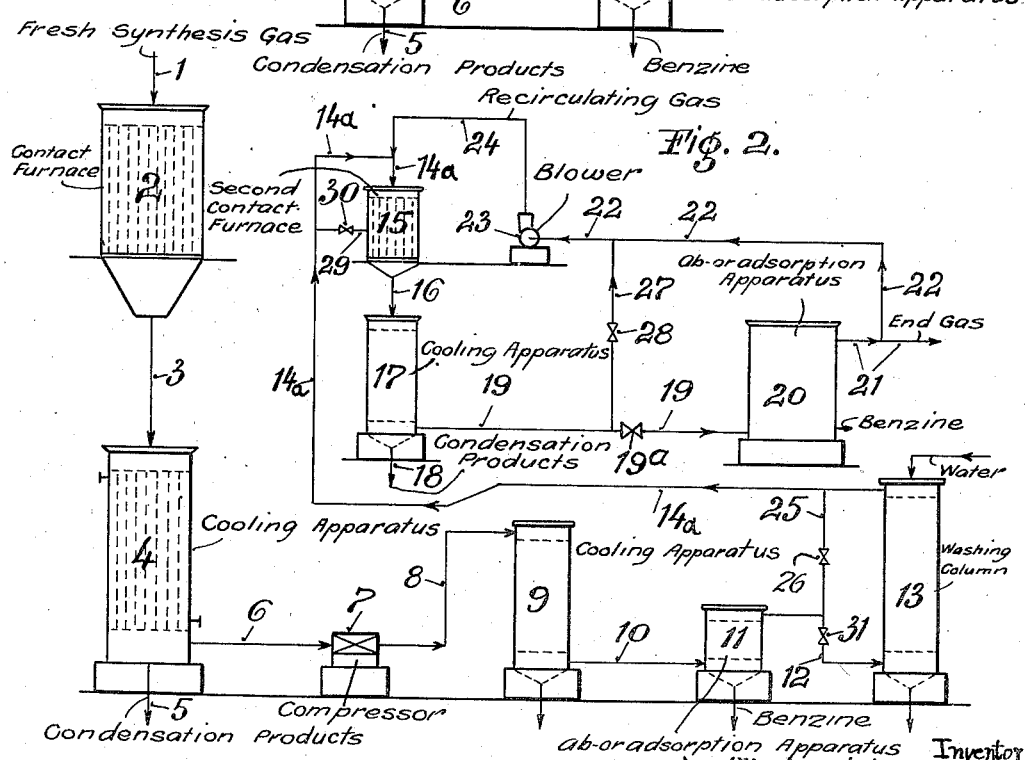
Fig. 2 shows an apparatus in which the catalytic conversion is carried out in two steps, the first of which being carried out under atmospheric pressure and the second at higher pressures.

In Fig. 2, the conduit 1 serves for introducing fresh synthesis gases into the contact furnace 2 which is operated under atmospheric pressure. After the synthesis gases have been subjected to the catalytic conversion, they are withdrawn from the catalytic furnace 2 and introduced into the cooling apparatus 4 by conduit 3. The condensation products are withdrawn through the conduit 5. The remaining gases are withdrawn from the cooling apparatus 4 by conduit 6 and are introduced into the compressor 7 wherein the gases are compressed to the stage desired for the second catalytic conversion. The compressed gases are withdrawn from the compressor 7 and are introduced into the cooling apparatus 9 to remove the heat of compression. The gases are then introduced into the ad- or absorption apparatus 11 through conduit 10 to remove the more volatile hydrocarbons which are formed. The end gas obtained from this ad- or absorption apparatus is then either introduced directly into the second contact furnace through conduits 25 and 14a or is then first subjected to a washing with water under pressure in the column 13 to remove any $CO_2$ present therein by opening valve 31 and closing valve 26 and subsequently introducing into the second contact furnace 15 through conduit 14a. The end gas may also be introduced into the contact furnace through conduit 29 by opening the valve 30. In the second contact furnace 15 the conversion is carried out at higher temperatures and pressures than are employed in the first contact furnace 2. After the catalytic conversion, the products are introduced into the cooling apparatus 17 through conduit 16 and the condensate is withdrawn through the conduit 18. The end gas obtained from such cooling apparatus is then either returned directly to the contact furnace 15 through conduits 19, 27, 22, 24 and 14a with the aid of the suction pump 23 or introduced into the ad- or absorption apparatus 20 through conduit 19 valve 19a being opened and valve 28 closed and then returned to the contact furnace 15 through conduits 21, 22, 24 and 14a with the aid of the suction pump 23. Conduit 21 also serves for the continuous removal of an amount of end gas from the second conversion substantially equal to the amount of fresh synthesis gas introduced into the second conversion stage from the first conversion stage.

I claim:

1. In the production of hydrocarbons containing more than one carbon atom by the catalytic conversion of carbon monoxide and hydrogen containing gases while maintaining temperatures below 300° C. with catalysts suitable for forming benzine, hydrocarbon oil and paraffin from such gases at atmospheric pressure and at temperatures below 300° C., said catalysts consisting of hydrogenating metals, difficultly reducible metal compounds and carrier substances, said carrier substances constituting at least half the weight of the catalysts, the improvement which comprises employing a carbon monoxide and hydrogen containing gas which contains more than 20% of inert constituents and a superatmospheric pressure of above two atmospheres for such conversion.

2. A process according to claim 1 in which the fresh gas is introduced into the catalyst at a point beyond the point at which the recirculated gas is introduced into the catalyst.

3. A process according to claim 1 in which the content of the inert constituents in said gases containing carbon monoxide and hydrogen is adjusted by the introduction of such gases occurring as reaction products in said catalytic conversion.

4. In the production of hydrocarbons containing more than one carbon atom by the catalytic conversion of carbon monoxide and hydrogen containing gases while maintaining temperatures below 300° C. with catalysts suitable for forming benzine, hydrocarbon oil and paraffin from such gases at atmospheric pressure and at temperatures below 300° C., said catalysts consisting of cobalt as a hydrogenating metal, thorium oxide and kieselguhr as a carrier substance, said kieselguhr constituting at least half the weight of the catalysts, the improvement which comprises employing a carbon monoxide and hydrogen containing gas which contains more than 20% of inert constituents and a superatmospheric pressure of above two atmospheres for such conversion.

5. A process for the catalytic conversion of carbon monoxide and hydrogen containing gases to form hydrocarbon containing more than one carbon atom which comprises supplying a fresh gas mixture containing carbon monoxide and hydrogen to a conversion catalyst suitable for forming benzine, hydrocarbon oil and paraffin from such gas at atmospheric pressure and at temperatures below 300° C., said catalyst consisting of hydrogenating metals, difficultly reducible metal compounds and carrier substances, said carrier substances constituting at least one-half the weight of the catalyst, maintaining a temperature below 300° C. and a pressure above two atmospheres during the conversion, removing at least a portion of the hydrocarbons produced by the resulting catalytic conversion from the end gas, and returning at least a sufficient quantity of the end gas remaining after such removal to the fresh gas that the resulting gas mixture supplied to the catalyst contains more than 20% of inert constituents.

6. In the production of hydrocarbons containing more than one carbon atom by the catalytic conversion of carbon monoxide and hydrogen containing gases while maintaining temperatures below 300° C. with catalysts suitable for forming benzine, hydrocarbon oil and paraffin from such gases at atmospheric pressure and at temperatures below 300° C., said catalysts consisting of hydrogenating metals, difficultly reducible metal compounds and carrier substances, said carrier substances constituting at least half the weight of the catalysts, the improvement which comprises starting the conversion with an end gas obtained in performing such conversion under atmospheric pressure, which end gas contains at least 20% of inert constituents and applying a pressure of above two atmospheres during such conversion of end gas.

7. A method according to claim 6 in which the pressure applied during the conversion of the end gas is sufficient that the partial pressure of the carbon monoxide and hydrogen corresponds substantially to the partial pressure of such constituents in the original gaseous mixture before conversion at atmospheric pressure.

8. In the production of hydrocarbons containing more than one carbon atom by the catalytic conversion of carbon monoxide and hydrogen containing gases while maintaining temperatures below 300° C. with catalysts suitable for forming benzine, hydrocarbon oil and paraffin from such gases at atmospheric pressure and at temperatures below 300° C., said catalysts consisting of hydrogenating metals, difficultly reducible metal compounds and carrier substances, said carrier substances constituting at least half the weight of the catalysts, the improvement which comprises performing such catalytic conversion in at least two stages, employing atmospheric pressure during the first stage, and employing a pressure of more than two atmospheres and a higher temperature than in the first stage for the second stage, the second stage being begun when the end gas of said first stage contains at least 20% of inert constituents.

9. A process according to claim 8 in which a part of the end gas of the last stage is recirculated after removal of at least a part of the reaction products therefrom.

10. In the production of hydrocarbons containing more than one carbon atom by the catalytic conversion of carbon monoxide and hydrogen containing gases while maintaining temperatures below 300° C. with catalysts suitable for forming benzine, hydrocarbon oil and paraffin from such gases at atmospheric pressure and at temperatures below 300° C., said catalysts consisting of hydrogenating metals, difficultly reducible metal compounds and carrier substances, said carrier substances constituting at least half the weight of the catalysts, the improvement which comprises employing for such conversion, an end gas of a methanol synthesis from carbon monoxide and hydrogen containing gases, which end gas contains at least 20% of inert constituents, and employing a pressure of more than two atmospheres for such conversion.

WILHELM HERBERT.